Nov. 9, 1926. 1,606,002

G. B. THORGNEY ET AL

MOTION PICTURE PROJECTING DEVICE

Filed August 2, 1923 3 Sheets-Sheet 1

INVENTORS
G. B. Thorgney
H. R. J. Sins
BY
Munn & Co.
ATTORNEYS

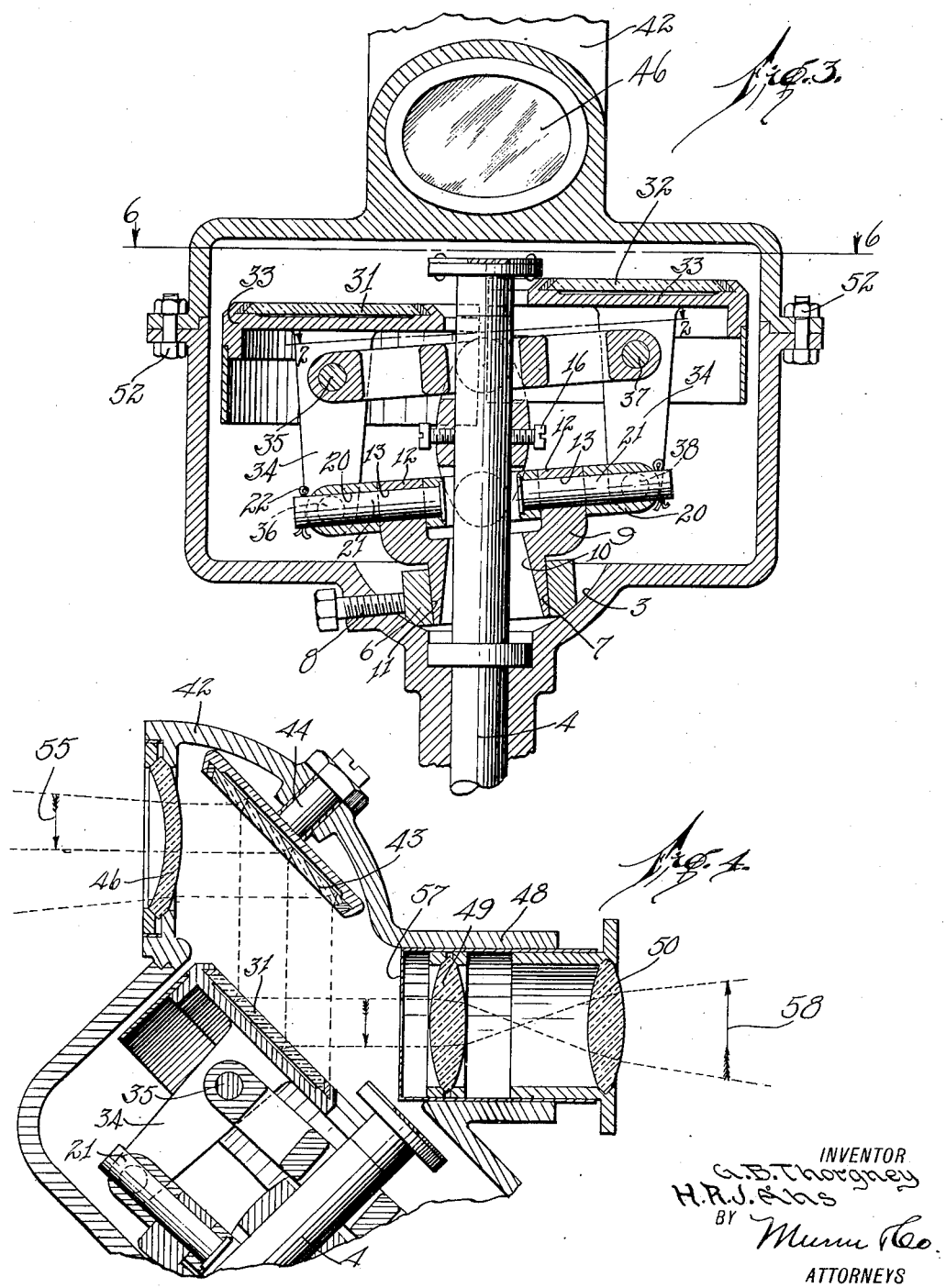

Nov. 9, 1926.
G. B. THORGNEY ET AL
1,606,002
MOTION PICTURE PROJECTING DEVICE
Filed August 2, 1923    3 Sheets-Sheet 3
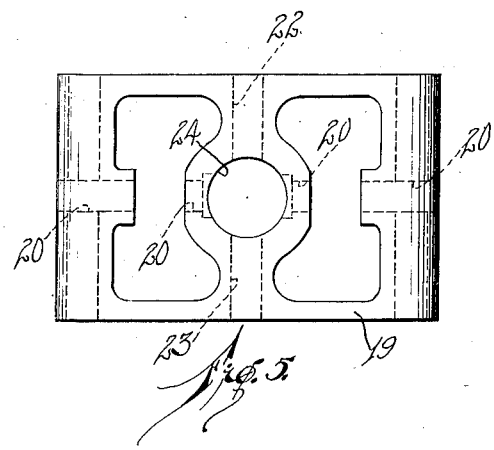
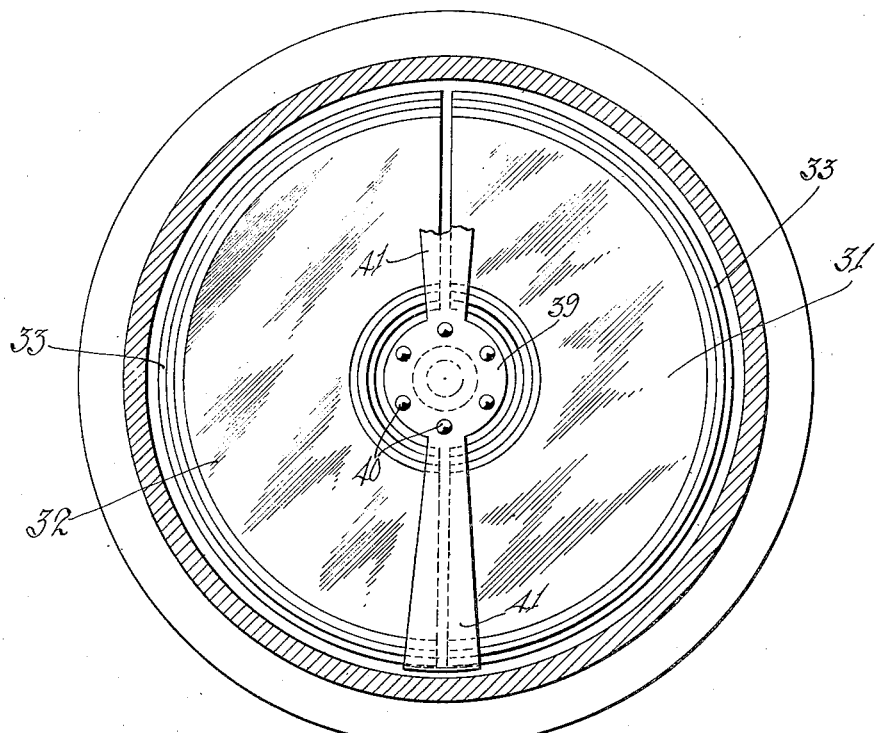
INVENTOR
G. B. Thorgney
H. R. J. Ris
BY
ATTORNEYS Patented Nov. 9, 1926.

1,606,002

UNITED STATES PATENT OFFICE.

GILLIS B. THORGNEY, OF CHICAGO, ILLINOIS, AND HELMER R. J. ÅHS, OF MJOLBY, SWEDEN.

MOTION-PICTURE-PROJECTING DEVICE.

Application filed August 2, 1923. Serial No. 655,327.

Our invention relates to improvements in motion picture projecting devices, and more particularly to that type of motion picture projector in which the movement of the film is continuous and uniform, and it consists in the combinations, constructions, and arrangements herein described and claimed.

An object of our invention is to provide a device of the character described in which the film is moved continuously and at a uniform rate of speed, thereby greatly facilitating the life of the film. It is well known that in the ordinary type of motion picture projector in which the film is moved intermittently at an exceedingly high rate of speed, the sprocket wheels have a destructive effect upon the film and therefore greatly shortens the useful life of the film.

A further object of our invention is to provide a device of the character described in which the flickering of the projected picture is reduced to a minimum, and in which the illumination of the projected image is exceedingly brilliant, due to the fact that the image is stopped by a shutter for only a small fraction of a second.

A further object of our invention is to provide a device of the character described in which moving mirrors and the mechanism for drawing the film through the device are so coordinated as to cause the image on the screen to remain stationary as the film is drawn through the device.

A further object of our invention is to provide a device of the character described which is durable, simple in construction, and highly efficient for the purpose intended.

Other objects and advantages will appear in the following specification, and the novel features of the invention will be particularly pointed out in the appended claims.

Our invention is illustrated in the accompanying drawings, forming part of this application, in which—

Figure 3 is a partial sectional view of the mechanism illustrated in Figure 1,

Figure 4 is a fragmentary sectional view of the mechanism illustrated in Figure 1 with the mirrors turned a quarter revolution, Figure 5 is a top plan view of a portion of the mechanism illustrated in Figure 1, and Figure 6 is a top plan view along the line 6—6 of Figure 3.

Figure 1:
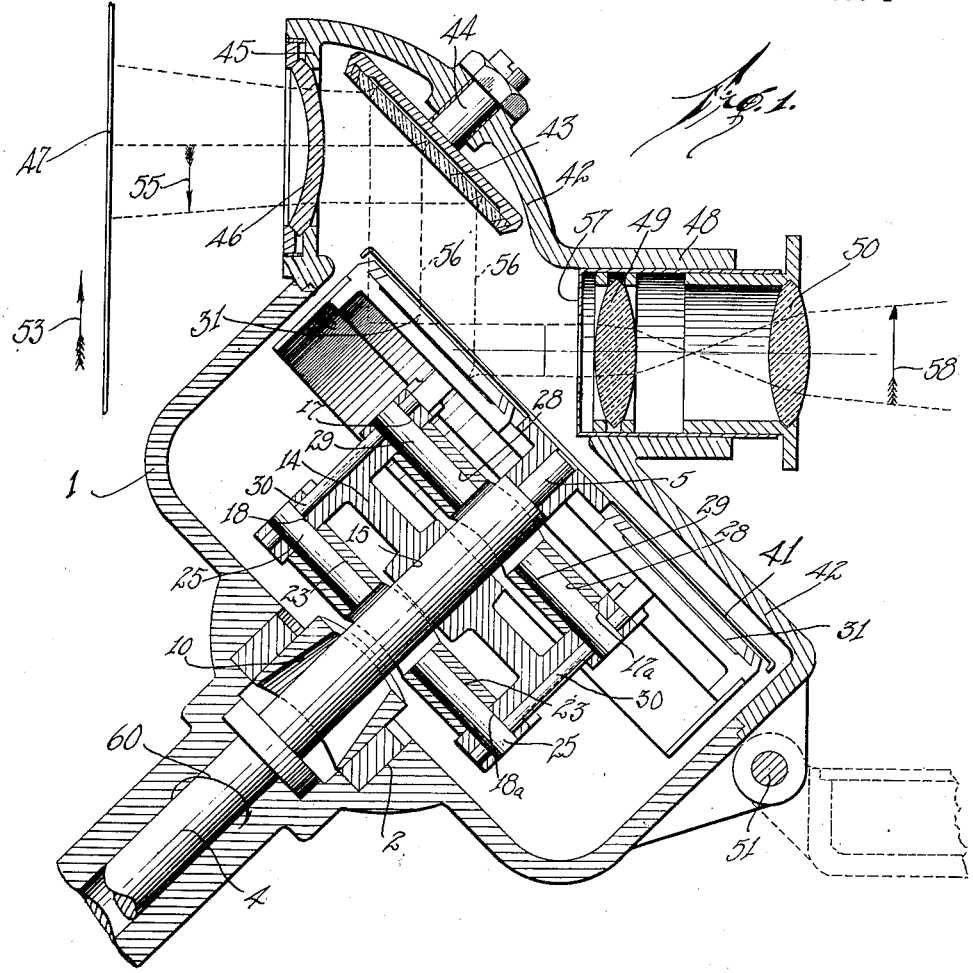
Figure 1 is a sectional view of an embodiment of our invention.

In carrying out our invention, we make use of a casing 1 substantially cup-shaped. The casing 1 is provided with a cavity 2 at its lowermost end having two substantially flat side walls and having its opposite walls 3 arcuate in shape (see Figure 3). A shaft 4 is projected through the casing, entering through the cavity 2, and terminates short of the top of the casing at 5. The shaft 4 is arranged to be connected with a driving mechanism (not shown) which may be a motor or any other ordinary type of drive mechanism.

A movable bearing 6 is disposed in the cavity 2 and is provided with a circular bore 7 therethrough. The bearing 6 is arranged to be rocked in one plane upon the arcuate side walls 3 of the cavity 2. A set screw 8 projected through the adjacent wall of the casing 1 is provided for locking the bearing 6 in its desired position so that the bearing may be tilted at the required angle relative to the axis of the shaft 4.

A bifurcated member 9, having a conical opening 10 therethrough, is disposed concentric with the shaft 4 and has a cylindrical outer wall 11 thereof in the circular bore 7 of the bearing 6. The purpose of the conical bore 10, as reference to Figures 1 and 3 will indicate, is to permit the bifurcated member 9 to be rotated relative to the adjusted bearing 6 so that the walls of the bore 10 may not contact the adjacent outer walls of the shaft 4. The bifurcated portions 12 of the member 9 are provided with alined openings 13 therethrough. The openings 13 are disposed on an axis perpendicular to the axis of the conical bore 10.

A supporting member 14, having substantially the shape of the letter H (see Figure 1), is mounted by means of a bore 15 therethrough concentric with the shaft 4, and set screws 16 are provided to lock the member 14 against movement in any direction relative to the shaft 4. This supporting member 14 has two pairs of alined openings 17—17ª and 18—18ª therethrough having their axes perpendicular to the shaft 4 and to the opening 15 through the supporting member.

A rack 19, which we choose to call the lower rack, and illustrated in Figure 5, is pivotally supported upon the bifurcated member 9 by means of alined openings 20 therethrough and the alined openings 13 of the bifurcated member, through which a pair of shaft members 21 are projected and secured against dislodgment by means of cotter pins 22 (see Figure 3).

The rack 19 is further pivotally connected with the supporting member 14 by means of the alined openings 18—18ª and alined openings 23 extending radially from an annular portion 24 of the rack 19 through which the shafts 4 project. Shafts 25 are projected through the openings 18—18ª and 23 for accomplishing the pivotal connection of the rack 19 with the supporting member 14.

Figure 2:
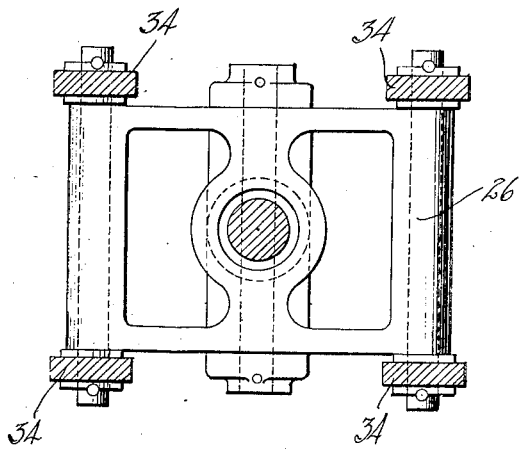
Figure 2 is a sectional view along the line 2—2 of Figure 3.

A second rack 26 (see Figure 2) precisely similar to the rack illustrated in Figure 5, but without possessing the alined openings 20, is pivotally connected to the supporting member 14 by means of alined openings 28, through which shafts 29 are projected, which in turn project through the adjacent shafts 17—17ª of the supporting member 14 (see Figure 1). The unintentional displacement of the shafts 25 and 29 is prevented by means of pins 30 which are projected through openings in the shafts 25 and 29, respectively, and extend through suitable openings provided therethrough in the supporting member 14 (see Figure 1).

A pair of semi-circular mirrors 31 and 32 are supported in suitable semi-circular rigid metal members 33. Each of the supporting members 33 has two downwardly extending legs 34.

The legs 34 of the mirror 31 are pivotally connected by means of openings therethrough and shafts 35 and 36 to the racks 19 and 26, respectively. The legs 34, associated with the mirror 32, are pivotally connected by means of shafts 37 and 38 to the opposite ends of the racks 19 and 26, respectively (see Figure 3). This parallelogram arrangement of parts insures at all times the parallel disposition of the four legs 34, and therefore the parallel arrangement of the mirrors 31 and 32, though one may be in a higher plane than the other.

A diminutive shutter or light shield comprising a disc of blackened metal 39 is riveted or otherwise fixed, as shown at 40, to the top of the shaft 4, and a pair of radially extending shield members 41 extend outwardly and exactly overlie the adjacent edges of the mirrors 31 and 32. The purpose of this light shield is primarily to preclude the reflection of lights on the mirrors from the edges thereof.

The casing 1 is provided with a hingedly mounted cover 42 in which a stationary mirror 43 is mounted by means of an adjustable shaft 44 projected through the cover 42.

The mirror 43 is parallel with the mirrors 31 and 32.

An aperture 45 is provided through the cover 42 in a plane 45 degrees from the plane of the mirror 43 and a biconcave lens 46 is secured in the aperture 45. The power of the lens 46 is so arranged as to cause rays of light to enter from a point exteriorly of the casing as through a moving film 47 to enter the casing through the lens and travel in straight lines to be reflected on the mirror 43 at an angle of 45 degrees upon one of two mirrors 31 and 32 extending upon the position of the shaft 4.

A second lens opening or aperture 48 is provided through the cover 42 having its axis parallel with the axis of the aperture 45, but disposed so that light reflected from the mirror 43 entering through the lens 46 and in turn reflected from the mirrors 31 or 32, may pass exteriorly of the casing through the aperture 48. A combined projection lens 49 is disposed in the aperture 48, one element thereof, as indicated at 50, being adjustable so that the accurate focus of the projected image may be obtained.

It will be noted that the cover 42 is hingedly secured to the casing 1, as indicated at 51, so that the cover may be moved away from the casing by unfastening suitable tie bolts 52 and access to the parts of the device gained.

It will be well to say at this time that the coordinating mechanism between the film 47 and the shaft 4 may be simply a reduction gear impelled by the aforementioned motor for driving the shaft 4 and having a drum over which the film 47 is engaged and drawn downwardly in the direction of the arrow 53. It must be noted, however, that the rotation of the shaft 4 is at a relatively slower speed than the travel of the film 47. We have not illustrated the accompanying lenses, lamp houses, and mechanism for drawing the film, since these mechanisms are but common structure and are otherwise classified.

From the foregoing description of the various parts of the device, the operation thereof may be readily understood. In operating our improved projection device, there is only one condition which must be obtained, that is, a perfect synchronism of the movement of the film 47 and the shaft 4 by any well known gear train means, i. e., one complete revolution of the shaft 4 must move the film 47 so that it has moved the distance occupied by two pictures thereof.

With reference to Figure 1, let us assume that a light is projected through the film 47 and that a picture on the film of an arrow 55 is transmitted through the lens 46 from the mirror 43 along the line 56 from the mirror 31, which at this time is at a higher level than the mirror 32 through an iris diaphragm 57 and through the projection lens 49. The resultant image in the form of the arrow 58 will be projected upon the screen. As the film moves upwardly in the direction of the arrow 53, the shaft 4 will continue to rotate in the direction of the arrow 60 (see Figure 1) and the mirror 31 will move in a counter clockwise direction, as viewed in Figure 6. As the mirror rotates in this direction, it will gradually move into a lower plane. In Figure 4, we have shown the shaft 4 rotated 90 degrees from the position shown in Figure 1, and it will be noted that the mirror 31 is at this time at a lower point relative to the top of the shaft and to the mirror 43 than when in the original position shown in Figure 1. At this time the arrow 55 projected from the film is in a higher position than the arrow 55 shown in Figure 1. This is true because the film moves as the shaft rotates, yet the arrow is accurately projected as will be seen in the resultant image 58 which is projected upon the screen.

The shaft 4 will continue to rotate and the arrow 55 will be projected accurately to form the resultant image 58 upon the screen. When the shaft has made a complete half revolution, the mirror will reach its lowest point relative to the shaft and further rotation of the shaft will cause the mirror 32, which at this time is higher than the mirror 31, to reflect the image 55 of the next picture upon the film which is in the position of the original arrow 55 in Figure 1. The shaft will rotate further and the second image or arrow 55 will be accurately projected upon the screen in the form of the arrow 58. At all times the mirrors 31 or 32, as the case may be, move downwardly relative to the mirror 43 as the film 47 moves upwardly, thereby following the images by the light passing through the film, in such a manner that the image of the arrow remains constant, yet at each one-half revolution of the shaft 4, the next picture on the film is changed for the preceding one.

There is but one instant in which no image is projected on the screen, that being at the instant the adjacent edges of the mirrors 31 and 32 pass under the mirror 43 and reflection of light is precluded by means of the shield 41.

It will be apparent therefore that we have provided a mechanism by means of which the image from the film is constantly projected upon the screen with but minute interruptions where the succeeding image takes the place of the preceding one at the instant reflection of the mirror is transmitted from one mirror to the other at each one-half movement of the shaft 4.

We claim:

1. In a device of the character described, a movable reflector consisting of a pair of semi-circular mirrors, a shaft, a rack pivotally mounted on said shaft for supporting said mirrors, one at each end thereof, and a stationary member engaged with said rack for causing the rocking of said rack when said shaft is turned, means cooperating with said rack for reciprocating said mirrors and for keeping the planes of said mirrors parallel to each other during the entire movement of said mirrors, and a shutter adapted to cover the adjacent ends of said mirrors.

2. A shaft, mirrors carried by said shaft, said shaft being rotatable to rotate said mirrors, means for moving said mirrors parallel with the longitudinal axis of said shaft, said means keeping the planes of the mirrors parallel with each other at all times, a fixed mirror for projecting the pictures from the film to the movable mirrors, and a fixed lens for receiving the pictures projected from the movable mirrors.

3. A motion picture projection device for use with films driven at a continuous uniform speed comprising a stationary projection lens, a stationary reflector, a pair of semi-circular reflectors, means for rotating said semi-circular reflectors on their axis, means including reflector-moving means for causing one of the reflectors to move out of the plane of the other reflector during the movement of the film at predetermined limits, and means for guiding said reflector-moving members in their movement for causing the members to hold the reflectors in planes parallel with each other during their entire movement.

4. In a device of the type described, a movable reflector consisting of a pair of semi-circular mirrors, a shaft, a rack pivotally mounted on said shaft for supporting said mirrors, a stationary member engaging with said rack for causing the rocking of said rack when said shaft is turned, mirror-moving members connecting the mirror with said rack, and means for causing said mirror-moving members to keep the mirrors parallel with each other during the entire movement of the mirrors.

5. A motion picture projection device for use with films driven at a continuous uniform speed comprising a stationary projection lens, a stationary reflector adapted to reflect pictures from the film, movable reflectors adapted to project films from the stationary reflector to the lens, means for moving one of the reflectors out of the plane of the other reflector during the movement of the film through predetermined limits, whereby the pictures from the film are projected to the optical axis of the projection lens, and means actuated by said first named means for keeping the planes of the reflectors parallel with respect to each other during their entire movement.

6. A motion picture projection device for use with films driven at a continuous uniform speed comprising a fixed mirror adapted to reflect the pictures of a moving film, a movable mirror, and means for moving said movable mirror in a direction at right angles to the plane of the mirror, whereby the surface of the mirror will always remain at the same angle with respect to its line of movement.

7. A motion picture projection device for films driven at a continuous uniform speed comprising a stationary projecting lens, a fixed mirror adapted to reflect pictures from a moving film, a movable mirror, means for moving said movable mirror in a direction at right angles to the plane of the mirror, a second movable mirror, means for moving said second movable mirror in a direction at right angles to the plane of the mirror, and means for rotating said mirrors about a common axis.

8. A motion picture projection device for use with films driven at a continuous uniform speed comprising a stationary projecting lens, a fixed mirror, a shaft having its longitudinal axis projecting at right angles to the plane of said mirror, a collar loosely receiving said shaft and having its axis inclined at an angle with respect to said shaft, a bearing for rotatably receiving said collar, movable mirrors having their planes disposed parallel with the plane of the fixed mirror, mirror-moving members operatively connecting said mirrors with said collar, whereby a rotation of said collar will rotate said mirrors and will move the mirrors along their longitudinal axis, means associated with said members for keeping the planes of the movable mirrors parallel with each other during their entire movement, and a projecting lens adapted to receive the reflected pictures from said movable mirrors.

GILLIS B. THORGNEY.
HELMER R. J. AHS.